United States Patent
Scheidiger et al.

(10) Patent No.: US 11,471,979 B2
(45) Date of Patent: Oct. 18, 2022

(54) MACHINING APPARATUS FOR LASER MACHINING A WORKPIECE, SET OF PARTS FOR A MACHINING APPARATUS FOR LASER MACHINING A WORKPIECE AND METHOD FOR LASER MACHINING A WORKPIECE USING SUCH MACHINING APPARATUS

(71) Applicant: BYSTRONIC LASER AG, Niederönz (CH)

(72) Inventors: Simon Scheidiger, Langenthal (CH); Andreas Luedi, Burgdorf (CH); Roland Zollinger, Brittnau (CH); Martin Mumenthaler, Rohrbach (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/310,982

(22) PCT Filed: Aug. 14, 2020

(86) PCT No.: PCT/EP2020/072878
§ 371 (c)(1),
(2) Date: Sep. 2, 2021

(87) PCT Pub. No.: WO2021/032625
PCT Pub. Date: Feb. 25, 2021

(65) Prior Publication Data
US 2022/0040795 A1    Feb. 10, 2022

(30) Foreign Application Priority Data
Aug. 16, 2019  (DE) .......................... 102019122064.5

(51) Int. Cl.
*B23K 26/38*      (2014.01)
*B23K 26/064*     (2014.01)
(Continued)

(52) U.S. Cl.
CPC ............ *B23K 26/38* (2013.01); *B23K 26/046* (2013.01); *B23K 26/0643* (2013.01);
(Continued)

(58) Field of Classification Search
CPC .... B23K 37/003; B23K 26/38; B23K 26/046; B23K 26/0643; B23K 26/082;
(Continued)

(56) References Cited

U.S. PATENT DOCUMENTS 4,048,464 A * 9/1977 Gale .................. B23K 26/0648
                                                219/121.72
4,202,605 A * 5/1980 Heinz .................... G02B 26/06
                                                359/845
(Continued)

FOREIGN PATENT DOCUMENTS

CN   208255526 U  * 12/2018
DE       2821883 B1   10/1979
(Continued)

OTHER PUBLICATIONS

Machine translation of WO2015055222A1, Dec. 2021.*
(Continued)

*Primary Examiner* — Geoffrey S Evans
(74) *Attorney, Agent, or Firm* — Workman Nydegger (57) ABSTRACT

A machining apparatus for laser machining a workpiece (12) in a machining zone (13) is provided, having a first interface (14) for a machining laser source for generating a machining laser beam (15), an outlet opening (18) for the machining laser beam (15), In an optical system between the first interface (14) and the outlet opening (18), which has at least one laser beam guiding device (22) having at least one movable surface (24) and at least one actuator (26), with which the movable surface (24) is dynamically adjustable, and a cooling device (28) for cooling the at least one actuator
(Continued)

(26), wherein the cooling device (28) has at least one primary circuit (30) through which a first cooling fluid can flow without contact with the actuator (26). Furthermore, a set of parts for a machining apparatus for laser machining a workpiece (12) and a method of laser machining a workpiece (12) using such machining apparatus are also provided.

18 Claims, 3 Drawing Sheets

(51) Int. Cl.
  *B23K 26/082* (2014.01)
  *B23K 26/70* (2014.01)
  *B23K 26/046* (2014.01)
  *B23K 26/06* (2014.01)
  *B23K 37/00* (2006.01)
  *G02B 26/08* (2006.01)
  *G02B 26/10* (2006.01)

(52) U.S. Cl.
  CPC .......... *B23K 26/082* (2015.10); *B23K 26/703* (2015.10); *B23K 37/003* (2013.01); *G02B 26/0825* (2013.01); *G02B 26/101* (2013.01)

(58) Field of Classification Search
  CPC .............. B23K 26/703; G02B 26/0825; G02B 26/101; G02B 7/185; G02B 7/195
  See application file for complete search history.

(56) References Cited

U.S. PATENT DOCUMENTS

| | | | | |
|---|---|---|---|---|
| 4,808,791 A * | 2/1989 | Puozzo | ................. | C21D 9/0068 148/903 |
| 5,303,081 A * | 4/1994 | Totsuka | ................ | G02B 7/1815 219/121.13 |
| 5,411,502 A * | 5/1995 | Zair | ........................ | A61B 18/20 606/10 |
| 5,571,430 A | 11/1996 | Kawasaki et al. | | |
| 5,777,807 A | 7/1998 | Bar et al. | | |
| 6,398,372 B1 * | 6/2002 | Okada | ................ | G02B 26/0825 359/846 |
| 6,706,999 B1 | 3/2004 | Barrett et al. | | |
| 8,781,269 B2 | 7/2014 | Huber et al. | | |
| 9,250,390 B2 | 2/2016 | Muendel et al. | | |
| 9,346,126 B2 | 5/2016 | Watanabe et al. | | |
| 2001/0008469 A1 | 7/2001 | Bar et al. | | |
| 2002/0008091 A1 * | 1/2002 | Brandinger | ........ | G02B 26/0841 219/121.67 |
| 2004/0027698 A1 * | 2/2004 | Bischof | ................ | G02B 7/1815 359/871 |
| 2011/0000640 A1 * | 1/2011 | Jensen | .................... | F28F 9/026 165/47 |
| 2011/0116518 A1 * | 5/2011 | Andreasch | ......... | B23K 26/0608 372/9 |
| 2015/0158123 A1 * | 6/2015 | Kyoto | .................. | B23K 26/128 219/121.73 |
| 2015/0378184 A1 * | 12/2015 | Tayebati | ................. | G02F 1/295 250/492.1 |
| 2016/0368089 A1 * | 12/2016 | Grapov | .................. | G02B 27/40 |
| 2019/0151985 A1 * | 5/2019 | Sbetti | ................. | G02B 26/0825 |
| 2019/0242566 A1 * | 8/2019 | Zirilli | .................... | F21V 29/505 |

FOREIGN PATENT DOCUMENTS

| | | | | |
|---|---|---|---|---|
| DE | 4206792 A1 | 9/1993 | | |
| DE | 102008053397 B4 | 12/2009 | | |
| DE | 102015116033 A1 | 3/2016 | | |
| DE | 102015101263 A1 | 7/2016 | | |
| EP | 1030206 A2 | 8/2000 | | |
| EP | 1104940 A1 | 6/2001 | | |
| EP | 1447068 A1 | 8/2004 | | |
| EP | 2730363 A1 | 5/2014 | | |
| EP | 2762263 A1 | 8/2014 | | |
| EP | 2778746 B1 | 9/2014 | | |
| EP | 3412400 A1 | 12/2018 | | |
| JP | 55100523 A * | 7/1980 | .......... | B23K 26/703 |
| JP | S60102290 A | 6/1985 | | |
| JP | 01228691 A * | 9/1989 | | |
| JP | 05106957 A * | 4/1993 | | |
| JP | 2000334592 A * | 12/2000 | | |
| WO | WO-2015055222 A1 * | 4/2015 | .......... | G02B 7/1815 |
| WO | WO-2020245353 A1 * | 12/2020 | ............. | B23K 26/38 |

OTHER PUBLICATIONS

Machine translation of Japan Patent No. 01228691-A, Jan. 2022.*
Machine translation of Japan Patent document No. 200033459A, Apr. 2022 (Year: 2022).*
Machine translation of China Patent document No. 208255526U, Apr. 2022 (Year: 2022).*
Fraunhofer Institute for Material and Beam Technology IWS, "Dynamic beam shaping increases the attractiveness of laser beam fusion cutting", Press Release, Oct. 21, 2016, https://www.iws.fraunhofer.de/en/pressandmedia/press_releases/2016/press_release_2016-15.html.
Fraunhofer-Institute for Applied Optics and Precision Engineering IOF, "Highlights 2019: Fraunhofer IOF at the Laser World of Photonics", Press Release, Jun. 17, 2019, https://www.iof.fraunhofer.de/de/pressemedien/pressemitteilungen/2019/LASER-Messe-Highlights.html.
C. Goppold et al., "Tip-Tilt piezo platform scanner qualifies dynamic beam shaping for high laser power in cutting applications", LIM conference, Munich, Jun. 2019.
Piezomechanik GmbH, "Piezoaction in Practice", Extended actuator functions, options, p. 42, https://www.piezomechanik.com/fileadmin/filestorage/Kataloge/de/Piezomechanik_Katalog_D_2010-05-05_web.pdf.
Physik Instruments (PI), User Manual PZ249 Preloaded Piezo Actuators, Version 1.1.0, Sep. 5, 2018, p. 26, https://static.physikinstrument.com/fileadmin/user_upload/physik_instrument/files/user_manuals/P-21x-Benutzeranleitung-PZ249D110.pdf.
International Search Report and Written Opinion from PCT/EP2020/072878 filed Aug. 14, 2020, dated Dec. 9, 2020.
International Preliminary Report on Patentability from PCT/EP2020/072878 filed Aug. 14, 2020, dated Jul. 12, 2021.
Physik Instruments (PI), Piezoelectric Actuators Components, Technologies, Operation, p. 62 and Figure 48, Jul. 2020, https//www.dyneos.ch/wp-content/uploads/2020/07/PI_CAT128E_R3_Piezoelectric_Actuators.pdf.

* cited by examiner

MACHINING APPARATUS FOR LASER MACHINING A WORKPIECE, SET OF PARTS FOR A MACHINING APPARATUS FOR LASER MACHINING A WORKPIECE AND METHOD FOR LASER MACHINING A WORKPIECE USING SUCH MACHINING APPARATUS

The present invention relates to a machining apparatus for laser machining a workpiece, use of a machining apparatus for laser machining a workpiece, a set of parts for a machining apparatus for laser machining a workpiece and a method for laser machining a workpiece.

Laser machining apparatuses are used in the laser machining of workpieces, in particular in methods for the thermal separation of materials by means of laser radiation, such as laser cutting. In many cases, a laser machining head is used to guide the machining laser beam onto the workpiece, for example onto a sheet to be machined. For example, in flatbed cutting systems, the workpiece is machined with a laser beam and a gas jet. The machining head is configured as a cutting head and directs the two beams to the workpiece in an optimal manner. Depending on the workpiece (material and thickness) and the desired process, a different laser beam may be optimal.

Most available cutting heads for medium laser powers of over 1 kW have an unchangeable optical projection of the laser beam on the workpiece to be machined. This projection represents a compromise. The beam can be used for different materials as well as for thin and thick workpieces. In contrast, a rigid optical projection of the laser beam is accompanied by losses in cut quality and/or feed rate for most materials and thicknesses.

Therefore, zoom optics have been developed for laser machining and used in cutting heads. With these, the imaging ratio, i.e. the focal length of the optic, can be changed within a certain range, in particular depending on the type and thickness of the workpiece. In zoom optics, at least two optical elements can typically be set such that the position of the focus of the machining laser beam is displaced parallel to its direction of propagation.

Furthermore, there are approaches for laser machining in which the laser beam is shaped. Beam shaping can be understood to mean changing the beam parameter product of the laser beam and/or changing the mixture of the electromagnetic laser modes and/or varying the transverse distribution of the power of the laser beam. There is static beam shaping, in which the beam parameter product is adjusted at one time or a plurality of singular (isolated) times, as described in EP3412400 A1. In addition, there is also dynamic beam shaping (DBS), in which the beam parameter product is changed by continuous dynamic movement of the laser beam over a period of time, in an averaged or integrated manner, for example by beam oscillation. Various solutions in this direction are known, for example U.S. Pat. No. 8,781,269 B2, U.S. Pat. No. 9,250,390 B2, U.S. Pat. No. 9,346,126 B2, EP 2730363 A1, EP2762263 A1, DE2821883 B1, DE 102015116033 A1, EP 2778746 B1, and DE 102015101263 A1 for static beam shaping; DE102008053397 B4 for dynamic beam shaping.

In laser machining using dynamic beam shaping, the laser beam is moved across the workpiece to be machined at frequencies of, for example, 100 Hz to 10 kHz, i.e. at frequencies that are significantly higher than the typical reaction time between the laser beam and the material. The workpiece is thus machined with a power distribution of the machining laser beam averaged over time or integrated over time. By means of dynamic beam shaping, almost any power distributions and intensity distributions of the laser beam spot can be generated. It is also known that better cutting results can be achieved with such adapted laser beams, see e.g. www.iws.fraunhofer.de/en/pressandmedia/press_releases/2016/press_release_2016-15.html.

Adaptive or deformable mirrors can be used for beam shaping of laser beams, such as those available from AOS (Active Optical Systems, LLC) or Fraunhofer IOF (see also "Fast adaptive focusing mirrors for material processing" www.iof.fraunhofer.de/de/presse-medien/pressemitteilungen/2019/LASER-Messe-Highlights.html. If surface areas of the mirror can be quickly adjusted independently of one another, for example with frequencies of more than 100 Hz, dynamic beam shaping can be performed with such mirrors.

Furthermore, the Fraunhofer IWS Dresden has shown that a tip/tilt piezo scanner appears to be suitable for dynamic beam shaping, see C. Goppold et al., "Tip-Tilt piezo platform scanner qualifies dynamic beam shaping for high laser power in cutting applications", LIM conference, Munich, June 2019. For this purpose, an approx. 1 inch mirror was coupled to a piezo actuator, which moves the mirror in a highly dynamic manner. Up to 2 kHz was thus achieved in just a short-term operation. Commercially available galvanoscanner (or galvanometer scanner) systems can typically be used up to the kHz range.

However, it has been shown that devices which are available on the market for dynamic laser beam shaping, for example tip/tilt piezo scanners, are susceptible to faults with high heat exposure/development, in particular in the range of higher vibration frequencies (several 100 Hz to a few kHz) and/or in long-term applications. With the resulting high vibration amplitudes, a high heat development per se can be determined by the actuator, in particular in continuous operation.

EP 1 030 206 A2 discloses a deformable mirror for laser beam and a mirror mount having a cooling water channel. According to U.S. Pat. No. 5,777,807 A and US2001008469 A, it is proposed to cool the mirror platform of a deformable mirror in a laser processing machine. EP1104940 A1 describes a solid-state actuator which is provided with a cold finger. EP1104940 A1 also states that air cooling of an actuator is technically complex and cannot be designed as a closed system. Air cooling of piezo actuators is described in www.piezomechanik.com/fileadmin/filestorage/Kataloge/de/Piezomechanik_Katalog_D_2010-05-05_web.pdf, page 42; in static.physikinstrument.com/fileadmin/user_upload/physik_instrument/files/user_manuals/P-21x-Benutzeranleitung-PZ249D110.pdf, page 26; and in www.dyneos.ch/pdf/Dyneos_Katalog_Piezoelektrische_Aktor.pdf, page 62, FIG. 48.

Laser machining heads must meet high cleanliness requirements. In typical devices for laser beam shaping by means of mirrors, for example a tip/tilt piezo scanner, there is an opening to the optical chamber of the laser machining head below the rear of the mirror. A gaseous cooling medium can be used to actively cool the scanner. For this purpose, large amounts of cooling medium (typical value for cooling air >100 l/min) are introduced into the scanner housing. However, the cooling medium can enter the optical chamber through the opening and come into contact with the mirror surface and other optical elements (e.g. deflecting mirrors, lenses and protective glasses). However, contamination in interaction with the laser beam can result in damage or even destruction of these optical elements. The cooling medium can therefore itself be the source of dirt in the scanner housing and/or in the optical chamber or can whirl up dirt present in the optical chamber by high flow velocities and thus direct them into the effective range of the laser beam in the optical elements.

It is the object of the invention to provide a machining apparatus and a method for laser machining of a workpiece, which allow reliable and/or less error-prone laser beam shaping.

This object is achieved by a machining apparatus for laser machining a workpiece according to the present invention, use of a machining apparatus according to the present invention, a set of parts for a machining apparatus for laser machining a workpiece according to the present invention, and a method for laser machining a workpiece according to the present invention.

In an embodiment of the invention, a machining apparatus for laser machining a workpiece in a machining zone, in particular for laser cutting, in particular a laser machining head, is provided, having a first interface for a machining laser source for generating a machining laser beam; an outlet opening for the machining laser beam; an optical system between the first interface and the outlet opening, which has at least one laser beam guiding device having at least one movable surface and at least one actuator, with which the movable surface is dynamically adjustable; and a cooling device for cooling the at least one actuator, wherein the cooling device has at least one primary circuit through which a first cooling fluid can flow without contact with the actuator.

At least one of the primary circuits can be configured to be actively flown through by the first cooling fluid, e.g. at least one of the primary circuits can include a device for actively flowing the first cooling fluid through the primary circuit, such as a pumping device. An interior of the machining apparatus can be provided between the first interface and the outlet opening. The laser beam guiding device can have an opening to the interior of the machining apparatus. The movable surface can be arranged in the interior of the machining apparatus and/or in the opening to the interior of the machining apparatus.

The machining apparatus enables the at least one actuator to be cooled without the first cooling fluid coming into contact with the actuator. Contamination of the actuator(s) and the movable surface is thus avoided. In this way, it is also avoided that the first cooling fluid from the surroundings of the actuator is able to enter the interior of the machining apparatus, also called the optical chamber, and come into contact with further optical elements there or swirl up dirt particles. In addition, the cooling of the actuators stabilises the function(s) of the laser beam guiding device at high temperatures, even in long-term operation in, for example, industrial applications. Thus, the at least one movable surface can be adjusted reliably by the at least one cooled actuator in a desired frequency range and even at high frequencies from several 100 Hz to a few kHz, and can work reliably and with little interference, in particular with high heat exposure/development.

Therefore, in the machining apparatus of embodiments, by adjusting the at least one movable surface, the beam parameter product of the temporally integrated machining laser beam can be reliably modified, even in long-term use and in the case of heat exposure/development typical for laser machining. In addition, if the movable surface is only spatially adjusted, the beam parameter product can be set and a static beam shaping of the machining laser beam can be carried out. If the movable surface is not only spatially but also temporally adjusted, i.e. over the course of one or more time periods, the beam parameter product can be set or varied, and dynamic beam shaping of the machining laser beam is made possible. In this way, almost any intensity distributions of the beam spot and beam parameter products of the machining laser beam can be provided. Due to the movable surface, the function of a change in focal length, an adjustment of the axial focus position and the functions of static and/or dynamic beam shaping can also be implemented in a single component. Therefore, a space-saving arrangement of the beam path of the machining laser beam can also be realised together with the cooling device. In addition, in order to provide the function of changing the focal length, the focus position adjustment and the functions of static and/or dynamic beam shaping, it is not necessary to move or displace the entire laser beam guiding device. The at least one laser beam guiding device and/or the at least one actuator can therefore be provided in the machining apparatus in a stationary manner and can be cooled.

In one embodiment, the cooling device can have a closed secondary circuit, through which a second cooling fluid can flow in contact with the actuator and which can be cooled by a first of the primary circuits. During cooling, the second cooling fluid can therefore come into contact with the at least one actuator. In addition, the secondary circuit is substantially closed. In some embodiments, the secondary circuit may at least partially include the interior of the machining apparatus (optical chamber). This can be the case, for example, when the second cooling fluid can get into the optical chamber, in particular through the opening of the laser beam guiding device to the optical chamber. In these embodiments, too, the secondary circuit is essentially closed, since only small or insignificant quantities of the second cooling fluid emerge from the outlet opening of the machining apparatus and thus from the optical chamber. Furthermore, the second cooling fluid can be cooled by the primary circuit. The secondary circuit can be configured to be actively flown through by the second cooling fluid, e.g. the secondary circuit can include a device for actively flowing the second cooling fluid through the secondary circuit, such as a pumping device.

These measures allow optimal and effective cooling of the at least one actuator to be achieved. At the same time, it is avoided that the second cooling fluid is able to cause contamination. The second cooling fluid specifically circulates in a closed cooling circuit so that the cleanliness of the second cooling fluid or the secondary circuit can be maintained. The secondary circuit and the second cooling fluid thus meet the same cleanliness requirements that apply to the optical chamber. This also applies if a part of the second cooling fluid reaches the optical chamber, since the secondary circuit also forms a system that is substantially closed to the outside, including the optical chamber. In addition, any amount of second cooling fluid can flow through the secondary circuit. Furthermore, due to the substantially closed secondary circuit, losses of the second cooling fluid are avoided and/or comparatively small amounts of the second cooling fluid are required. This ensures a high cooling efficiency.

In the machining apparatus, the cooling device can have at least one element selected from an interior, in which the at least one actuator and/or the laser beam guiding device is at least partially arranged, and a cooling structure. These elements promote effective cooling of the actuator.

The interior can thus be part of the secondary circuit. If the at least one actuator is at least partially arranged in the interior, it can be cooled with the second cooling fluid. If the laser beam guiding device is at least partially arranged in the interior, not only the at least one actuator, but also other elements of the laser beam guiding device that are exposed to heat during the laser processing process can be cooled with the second cooling fluid, for example by means of heat conduction. This optimises the reliability of the laser beam guiding device, in particular at high frequencies.

Furthermore, the cooling structure can be part of the first or a second of the primary circuits. If the cooling structure is part of the first primary circuit, the first cooling fluid can cool not only the secondary circuit, but also the cooling structure. If the cooling structure is part of the second primary circuit, the secondary circuit and the cooling structure can be cooled independently of one another.

In embodiments of the machining apparatus, the cooling structure can have a wall of the cooling device, which wall can be flowed through and is in particular at least partially surrounding the interior of the cooling device and/or the laser beam guiding device. As a result, the interior, in particular a gas contained therein, which surrounds the actuator, for example the second cooling fluid, can be cooled. Thus, the at least one actuator arranged in the interior can also be cooled. Additionally or alternatively, the laser beam guiding device can be at least partially cooled. For example, the wall of the cooling device can at least partially abut an outer wall of the laser beam guiding device. In this way, both the outer wall of the laser beam guiding device and other parts of the laser beam guiding device can be cooled by means of heat conduction.

Alternatively or additionally, the cooling structure can have at least one cooling fin, which can be flowed through and is arranged in particular in the interior of the cooling device. As a result, the interior, in particular a fluid contained therein, which surrounds the actuator, for example air, or a fluid which flows around the actuator, for example the second cooling fluid, can be cooled. Thus, the at least one actuator arranged in the interior can also be cooled.

In embodiments, the machining apparatus can have a second interface, at which the cooling device and/or the laser beam guiding device are interchangeably provided. Thus, the cooling device or the laser beam guiding device or both can be attached to the second interface and removed or replaced if necessary.

Furthermore, the first cooling fluid can be liquid and/or the second cooling fluid can be gaseous. In this way, the primary circuit can be operated, for example, with $H_2O$ as the first cooling fluid. Furthermore, a gaseous second cooling fluid, for example $N_2$, can flow around the at least one actuator.

Furthermore, the cooling device, in particular the wall of the cooling device, can be provided in a gas-tight manner on the machining apparatus. This minimises losses of the first cooling fluid and/or of the second cooling fluid.

In embodiments of the machining apparatus, the at least one actuator can be selected from a piezo actuator, an actuator of a galvanometer scanner, a plurality thereof and a combination thereof. The actuators mentioned can thus be effectively cooled and reliably operated.

According to embodiments, the at least one movable surface can be at least partially reflective for the machining laser beam. The at least one movable surface can also be dynamically orientable. Furthermore, the at least one movable surface can be a continuous surface that is dynamically deformable. Alternatively or additionally, the movable surface can be dynamically adjustable such that it modifies the beam parameter product of the temporally integrated machining laser beam. The at least one movable surface can also be adjustable such that it modifies the focal length of the optical system. Furthermore, the at least one movable surface can be adjustable such that it modifies the axial focus position of the machining laser beam. With these measures, individually or in combination, the machining laser beam can be directed onto the workpiece in an optimal form, for example adapted to the material and/or the thickness of the workpiece, and coordinated with the desired processing process.

In embodiments, the laser beam guiding device can have, as the at least one movable surface, at least one segmented mirror having a plurality of mirror segments, each of which are dynamically orientable. Furthermore, the laser beam guiding device can have, as the at least one movable surface, at least one dynamically deformable mirror. These measures enable highly flexible and/or high-frequency dynamic beam shaping of the machining laser beam. Alternatively or additionally, a change in the focal length of the optical system and/or focus position adjustment of the machining laser beam can be carried out.

In the machining apparatus of embodiments, the at least one movable surface can be adjustable such that it dynamically moves the machining laser beam at least perpendicular to the direction of propagation. The at least one movable surface can be adjustable such that it dynamically moves the machining laser beam and generates at least one focal point oscillation with at least one oscillation amplitude and at least one oscillation frequency and with a focal point oscillation path that corresponds to a two- or three-dimensional Lissajous figure or a combination of two- or three-dimensional Lissajous figures. These measures also enable highly flexible and highly dynamic and/or high-frequency beam shaping of the machining laser beam.

In the machining apparatus of embodiments, the at least one actuator can be configured to dynamically adjust the movable surface at a high frequency. Furthermore, the at least one movable surface can be adjustable with a frequency between 10 Hz and 15 kHz, preferably between 100 Hz and 10 kHz, more preferably between 400 and 10 kHz. This facilitates the dynamic beam shaping of the machining laser beam. In particular, a high-frequency dynamic adjustment of the movable surface and thereby a high-frequency dynamic movement of the machining laser beam, for example beam oscillation or focal point oscillation of the machining laser beam, can be effected.

In the machining apparatus, the laser beam guiding device, in particular the at least one movable surface, can be arranged and configured such that the machining laser beam is deflected at an angle of less than, equal to, or greater than 90°. This enables a flexible spatial configuration of the machining apparatus. Furthermore, the first interface can be connected to or provided with a machining laser source for generating the machining laser beam. In addition, a control unit for controlling the laser beam guiding device, in particular the at least one actuator, can be provided. In addition, the machining laser source can provide a laser power of at least 1 kW, preferably at least 4 kW, more preferably between 1 to 30 kW, most preferably between 1 to 25 kW.

The invention also relates to a use of a machining apparatus according to any one of the preceding embodiments for laser machining of a workpiece, in particular for laser cutting. In this way, the measures and advantageous effects for laser machining, in particular laser cutting, explained for the machining apparatus can be implemented.

Furthermore, the invention relates to a set of parts for a machining apparatus for laser machining a workpiece in a machining zone, in particular for a machining apparatus according to one of the previous embodiments, in particular for laser cutting. The set of parts contains a laser machining head having a first interface for a machining laser source for generating a machining laser beam, an outlet opening for the machining laser beam and a second interface between the first interface and the outlet opening. Thereby, the second interface is configured to receive at least one laser beam guiding device for an optical system, which has at least one movable surface and at least one actuator, with which the movable surface is dynamically adjustable. In addition, the set of parts contains a cooling device for cooling the at least one actuator, wherein the cooling device has at least one primary circuit through which a first cooling fluid can flow without contact with the actuator. The laser beam guiding device and the cooling device can thus be arranged, in particular can be attached, at the second interface. The set of parts thus enables the retrofitting of existing machining apparatuses with a cooling device for cooling the at least one actuator, as well as a repair thereof.

In a modification of the above embodiment, the set of parts contains at least one laser beam guiding device for an optical system, which has at least one movable surface and at least one actuator with which the movable surface can be dynamically adjusted. The machining apparatus can thus be provided not only with a cooling device for the actuator, but also with a laser beam guiding device.

The invention relates furthermore to a method for laser machining a workpiece with a machining apparatus according to any one of the preceding embodiments, in particular for laser cutting, with: irradiation of a machining zone of a workpiece with a machining laser beam from a machining laser source, which is provided at the first interface of the machining device, through the outlet opening of the machining apparatus; cooling of the at least one actuator of the laser beam guiding device by means of the first cooling fluid flowing through the at least one primary circuit without contact with the actuator; and dynamic adjustment of the movable surface with the at least one cooled actuator.

In the method of the above embodiment, the cooling of the actuator can have at least one step selected from: the second cooling fluid in contact with the actuator flowing through the closed secondary circuit, wherein the closed secondary circuit is cooled by the first cooling fluid flowing through the first of the primary circuits; and the first cooling fluid flowing through the first and/or the second of the primary circuits, in particular the cooling structure.

In the method of embodiments, the movable surface can be dynamically adjusted such that it modifies the beam parameter product of the temporally integrated machining laser beam. Alternatively or additionally, the laser beam guiding device, in particular the at least one movable surface, dynamically moves the machining laser beam at least perpendicular to the direction of propagation. Furthermore, the laser beam guiding device, in particular the at least one movable surface, can dynamically move the machining laser beam and can generate at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

With the method for laser machining a workpiece of the above embodiments, the same advantages, operating modes and functions can be realised as with the embodiments of the machining apparatus for laser machining a workpiece, in particular with identical and/or analogous features.

Further features and advantages become apparent from the following description of embodiments, the figures and the dependent claims.

All non-mutually exclusive features of embodiments described here can be combined with one another. The same elements of the embodiments are given the same reference signs in the following description. Individual or a plurality of elements of one embodiment can be used in the other embodiments without further mention. Embodiments of the invention are now described in more detail using the following examples with reference to figures, without intending any limitation thereby. In the figures:

EXAMPLES

The machining apparatus according to the embodiments of the invention are described below, inter alia, by way of examples with a machining head, without limiting the invention thereto. The machining apparatus and the method according to the embodiments of the invention can also be realised without a machining head.

Furthermore, where value ranges are described here, the specification of a broad range with narrower alternative or preferred ranges is also considered to disclose ranges that may be formed by any combination of specified lower range limits and specified upper range limits.

The term "integrated over time" or "averaged over time" means integrated or averaged over a period of time or a time period. In connection with a focal point oscillation, this means integrated or averaged over at least one oscillation period, integrated or averaged in connection with beam oscillation over at least one oscillation period.

The terms "dynamic movement" of the laser beam or "dynamically moving" laser beam and variants thereof mean that the laser beam is moved at high frequency, for example at frequencies from 10 Hz to 15 kHz. The same applies analogously to "dynamically" movable, orientable and/or adjustable elements of the machining apparatus.

Figure 1:
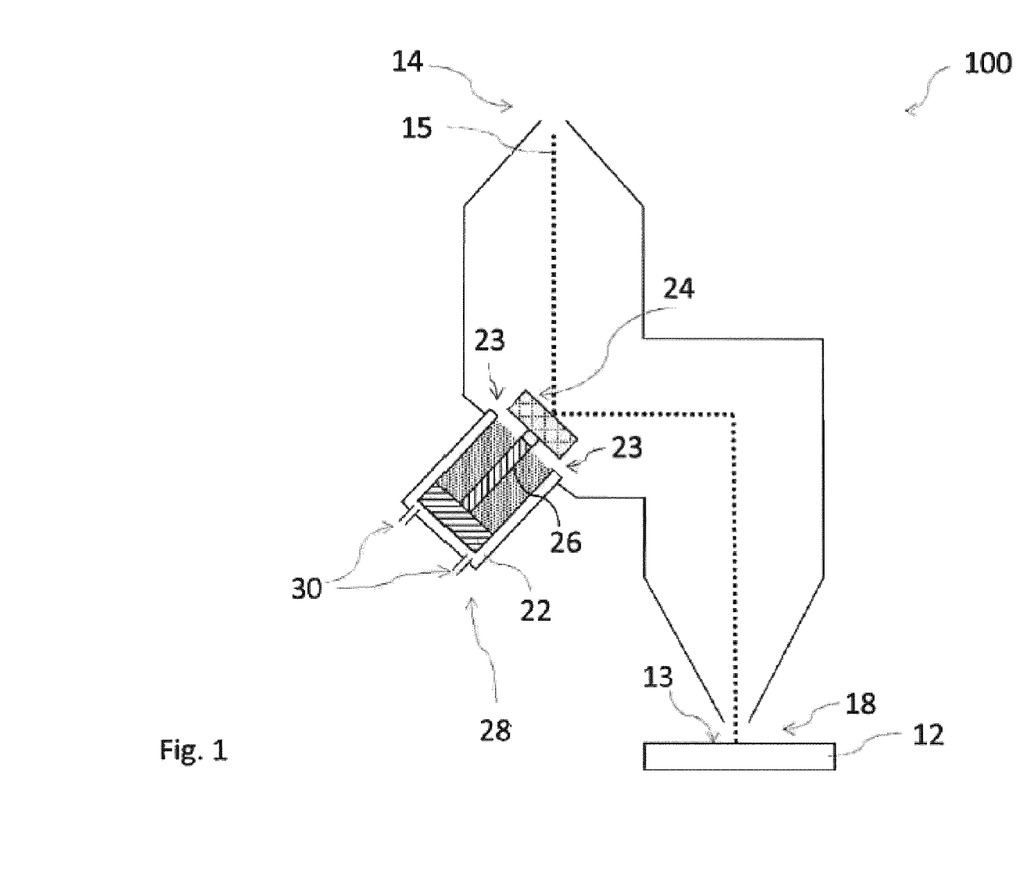
FIG. 1 schematically shows a machining apparatus 100 for laser machining a workpiece as a first example according to embodiments of the invention.

FIG. 1 schematically illustrates a first example of a machining apparatus 100 according to embodiments of the invention for laser machining a workpiece 12 in a machining zone 13. In the present example, the machining apparatus 100 is designed as a machining head.

Figure 3:
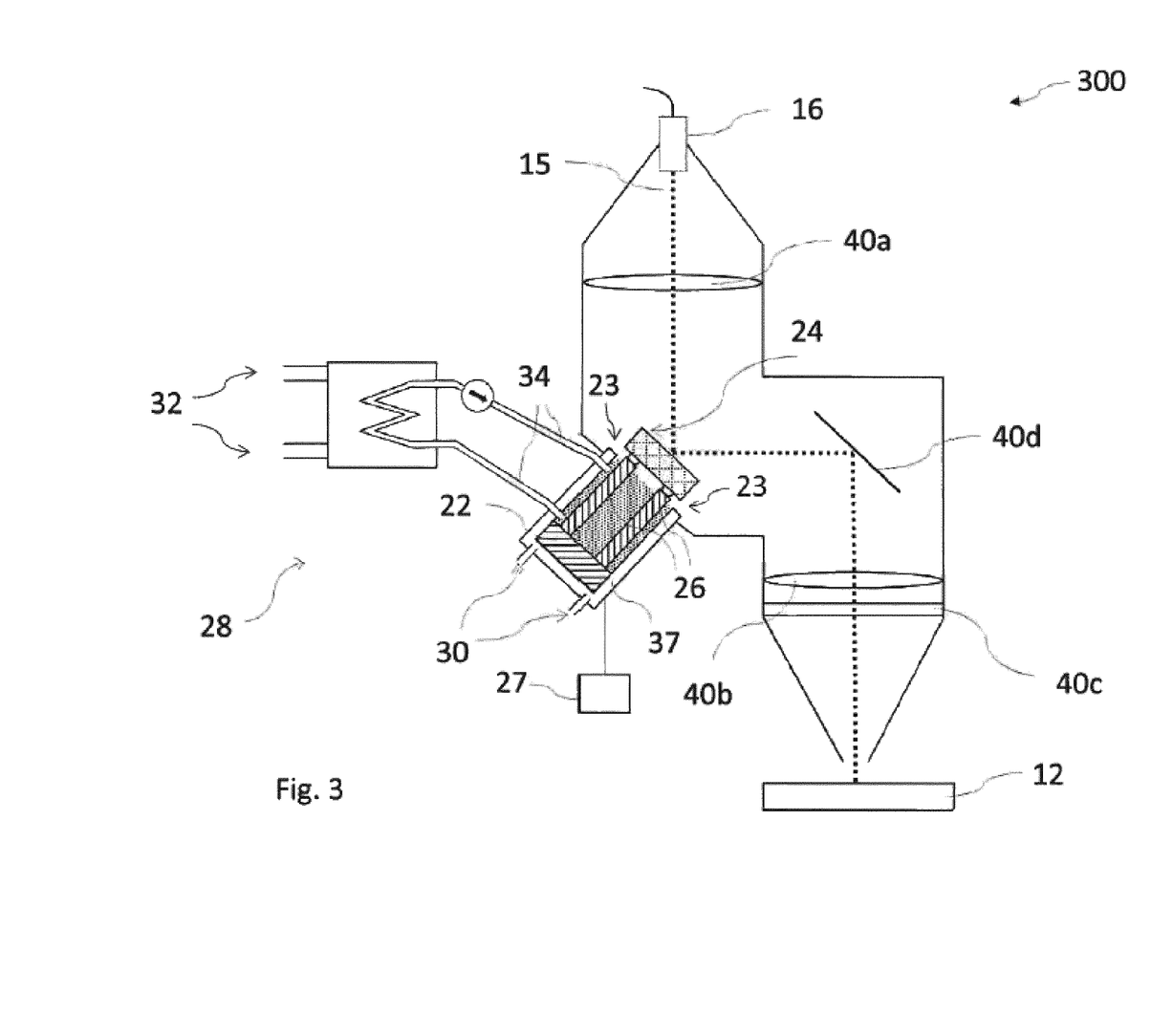
FIG. 3 schematically shows a machining apparatus 300 for laser machining a workpiece as a third example according to embodiments of the invention.

The machining apparatus 100 has a first interface 14 for a machining laser source 16 for generating a machining laser beam 15, which is shown in FIG. 1 with dashed lines as one beam. The machining laser source is not shown in FIG. 1. As shown by the example of FIG. 3, a machining laser source 16 or a transport fibre of the machining laser source 16 can be provided at the first interface 14, in particular in a gas-tight manner. In the present examples, the machining laser source 16 provides a laser power of about 6 kW and generates the machining laser beam in a spectral range which includes a wavelength of 1070 nm. However, machining laser sources with a power of less than 6 kW, for example approx. 1 kW, or with a power greater than 6 kW, for example approx. 20 kW, can also be used.

Furthermore, the machining apparatus 100 has an outlet opening 18 for the machining laser beam 15. Between the first interface 14 and the outlet opening 18, in particular between the first interface 14 and a protective glass in front of the outlet opening 18, for example protective glass 40c as shown in FIG. 3, there is an interior of the machining apparatus 100, also known as the optical chamber.

The machining apparatus 100 has an optical system with a laser beam guiding device 22, which is shown in FIG. 1 in the form of a cross-sectional view. The laser beam guiding device 22 is arranged in a fixed position in the area between the first interface 14 and the outlet opening 18. The laser beam guiding device 22 has an opening 23 to the optical chamber.

In the present example, the laser beam guiding device 22 has a movable surface 24 reflecting the machining laser beam 15, which is arranged and aligned in the optical chamber such that it deflects the machining beam 15 by 90°. As shown in FIG. 1, the machining laser beam 15 can be deflected again, for example by 90°, within the machining apparatus before it is directed through the outlet opening 18 onto the workpiece. For this purpose, for example a deflecting mirror 40d, as shown in FIG. 3, can be provided.

The reflective surface 24 is at least partially dynamically movable by means of at least one actuator 26. In FIG. 1 and in the following description, the present example is shown and described with an actuator 26, but it is also possible to provide a plurality of actuators 26 with which the reflecting surface 24 can be at least partially adjusted.

In this example, the laser beam guiding device 22 contains a dynamically orientable and planar mirror made of SiC (silicon carbide), which provides the movable surface 24. The plane mirror is provided with a surface coating reflecting the laser beam, for example a dielectric layer, a metal layer (for example copper) or metal oxide layer. Alternatively, a mirror made of glass substrate (e.g. fused silica, quartz glass) or sapphire can be used, which is provided with a dielectric layer, metal layer (e.g. copper) or metal oxide layer. The size of the mirror is chosen such that it corresponds to the diameter of the machining laser beam in the position of the mirror. A piezo actuator is provided as an actuator 26, by means of which the mirror can be moved dynamically and can thereby be oriented. The unit consisting of a mirror and at least one actuator is also called a piezo scanner. In the case of a plurality of actuators, each piezo actuator 26 can be individually controlled by means of a control unit (not shown in FIG. 1). In the present example, this is a piezo actuator based on a modified PZT (lead-zirconate-titanate) ceramic with a typical drive voltage of 120 V.

A cooling device 28 is provided on the laser beam guiding device 22. This contains a primary circuit 30 through which a cooling fluid, for example water, can flow. In the present example, the cooling device 28 is designed as a cooling housing partially enclosing the laser beam guiding device 22 with a wall 37 as a cooling structure, which is attached to the machining apparatus 100 in a gas-tight manner, for example by means of a flange or integrally. The term "gas-tight" means, for example, helium-tight at <10^(−4) (mbar*l)/s.

In this example, the wall 37 of the cooling housing, and thus the wall of the cooling device, has inner lines which, together with a cooling fluid supply line and a cooling fluid discharge line, form the primary circuit 30 of the cooling device 28.

During operation, a cooling fluid, for example water, is passed through the primary circuit 30 and the cooling housing. This cools a fluid, for example air, that surrounds the actuator 26 within the cooling housing. Therefore, the actuator 26 is also cooled. Since the wall 37 of the cooling housing at least partially abuts an outer wall of the laser beam guiding device, both the outer wall of the laser beam guiding device and other parts of the laser beam guiding device are cooled by means of heat conduction.

For laser machining, the mirror with the movable surface 24 is tilted by the piezo actuator 26 such that the machining laser beam 15 is deflected. At the same time, the mirror 24 is dynamically moved by the piezo actuator 26, providing suitable tilt angles for the deflection, so that the machining laser beam is dynamically moved. In this manner, the beam parameter product of the machining laser beam 15 and the intensity distribution of the laser beam spot on the workpiece 12 can be optimally designed for the respective method for laser machining, since the focal point of the machining laser beam 15 is dynamically moved to be at least perpendicular to its direction of propagation at frequencies, for example between 10 Hz and 15 kHz and thus the laser beam spot is shaped. For example, a focal point oscillation having at least one oscillation amplitude and at least one oscillation frequency and with a focal point oscillation path that corresponds to a two- or three-dimensional Lissajous figure or a combination of two- or three-dimensional Lissajous figures is generated when the machining laser beam 15 is dynamically moved.

With its cooling device 28, the machining apparatus 100 of the first example enables the at least one actuator 26 to be cooled during the dynamic beam shaping of the machining laser beam 15 without the first cooling fluid coming into contact therewith. This prevents contamination of the actuators and the mirror. In this way, it is also avoided that the first cooling fluid can enter the optical chamber of the machining apparatus and come into contact with other optical elements or swirl up dirt particles. In addition, the cooling of the actuator stabilises the beam formation, even at high frequencies from several 100 Hz to a few kHz. The at least one actuator can therefore also be used reliably in the event of high heat exposure/development and in long-term operation, for example in industrial applications.

In a modification (not shown) of the first example, the laser beam guiding device 22 contains two movable surfaces 24, which are part of a galvanometer scanner. For this purpose, the galvanometer scanner can contain two mirrors, each of which provides a movable surface 24. Each of these can be individually and dynamically moved as actuators using individually controllable galvanometers. The actuators are cooled by the cooling device 28, which is structurally adapted accordingly. The galvanometer scanner is provided, for example, with two mirrors orientable such that the machining laser beam 15 is deflected at least once at an angle greater than 90° and at least once at an angle smaller than 90°. During operation, the two mirrors are oriented and moved relative to one another such that the machining laser beam 15 is deflected twice and is simultaneously dynamically moved. As a result, almost any intensity distribution of the beam spot and beam parameter products of the machining laser beam 15 are provided by means of dynamic beam shaping, in particular Lissajous figures can be written on the workpiece with the laser beam. Due to the cooling of the actuators, this can take place in a stable manner even with high heat exposure/development and in long-term operation.

Figure 2:
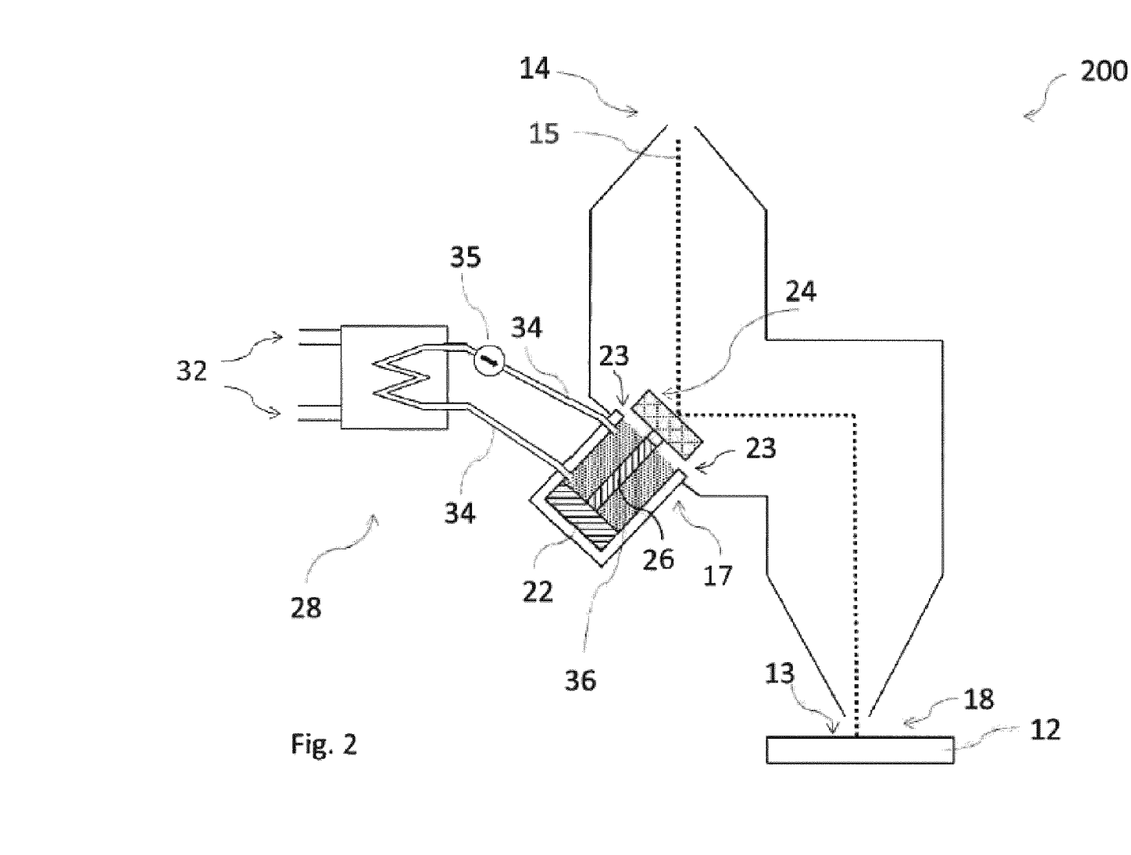
FIG. 2 schematically shows a machining apparatus 200 for laser machining a workpiece as a second example according to embodiments of the invention.

FIG. 2 schematically shows a second example of a machining apparatus 200 according to embodiments of the invention for laser machining a workpiece 12. In contrast to the first example, the cooling device 28 has a primary circuit 32 separate from the machining apparatus 200 and a secondary circuit 34. Analogous to the primary circuit 30 of the first example, the primary circuit 32 can be flowed through by a first cooling fluid, for example $H_2O$, via supply and discharge lines. The secondary circuit 34 can be flowed through by a gaseous second cooling fluid, for example $N_2$, in contact with the at least one actuator and can be cooled by the first primary circuit 32. In the present example, the primary circuit 32 contains a heat exchanger through which the secondary circuit 34 also runs in part and can thus be cooled.

The secondary circuit 34 has a feed line, in the present case with a circulation pump 35 (illustrated by the arrow in a circle in FIG. 2), into an interior 36 of the cooling device. The interior 36 is sealed in a gas-tight manner by a wall of the cooling device with respect to the outside of the machining apparatus 200. In the present case, the wall is designed as a housing. The laser beam guiding device 22 is arranged in the housing. Furthermore, the secondary circuit has a discharge line from the interior 36. The supply and discharge lines of the secondary circuit 34 are connected to one another within the heat exchanger of the primary circuit 32. In this way, the secondary circuit 34 is substantially closed. Thus, as can be seen from FIG. 2, the second cooling fluid can be introduced into the interior 36 and can also be discharged therefrom. For this purpose, the secondary circuit 34 in the present example contains the circulation pump 35. Alternatively or additionally, the second cooling fluid can diffuse back into the discharge line due to the cooling through the primary circuit 32. Both measures, individually or in combination, result in the second cooling fluid being able to be returned from the interior 36 to the discharge of the secondary circuit 34 substantially without loss. The interior 36 of the cooling device 28 is part of the secondary circuit 34 in the present example.

In a modification of this example, the secondary circuit 34 at least partially also includes the interior of the machining apparatus 200 (optical chamber). This can be the case, for example, when the second cooling fluid passes through the opening 23 into the optical chamber. In this modification, too, the secondary circuit is substantially closed, since only insignificant or small amounts of the second cooling fluid escape from the interior of the machining apparatus 200, in particular from the outlet opening 18.

In operation, the second cooling fluid, in the present case gaseous $N_2$, is passed through the secondary circuit 34 and the first cooling fluid, in the present case $H_2O$, is passed through the primary circuit 30. In this way, the second cooling fluid is cooled and passed into the interior 36. For laser machining, the mirror with the movable surface 24 is tilted by means of the at least one piezo actuator 26 such that the machining laser beam 15 is deflected. At the same time, the mirror 24 is dynamically moved by the piezo actuator 26, providing suitable tilt angles for the deflection, so that the machining laser beam 15 is dynamically moved. The piezo actuator 26 is cooled with the second cooling fluid that flows around it in the interior 36. The focal point of the machining laser beam 15 is moved dynamically at least perpendicular to its direction of propagation with frequencies, for example between 10 Hz and 15 kHz, and the laser beam spot is shaped. Due to the cooling of the actuator, a desired beam parameter product of the machining laser beam 15 and a desired intensity distribution of the laser beam spot on the workpiece 12 are thus reliably provided even with high heat exposure/development and in long-term operation.

Since the at least one actuator 26 is at least partially arranged in the interior 36, the actuator 26 can be cooled with the second cooling fluid. Furthermore, as explained above, in the present example, the laser beam guiding device 22 is arranged in the housing and therefore also at least partially in the interior 36. Therefore, not only the actuator 26, but also other elements of the laser beam guiding device 22 that are subjected to heat during the laser machining process, for example the mirror, can be cooled with the second cooling fluid. As a result, the reliability of the laser beam guiding device 22 is additionally increased.

The combination of the primary circuit 32 with the secondary circuit 34 not only ensures optimal cooling of the actuator 26. Due to the substantially closed secondary circuit 34, it is additionally avoided that the second cooling fluid in the optical chamber of the machining apparatus can cause contamination. Furthermore, because of the substantially closed secondary circuit 34, losses of the second cooling fluid are minimised and/or comparatively small amounts of the second cooling fluid are required.

FIG. 3 schematically shows a third example of a machining apparatus 300 according to embodiments of the invention for laser machining a workpiece 12. In the third example, the cooling device 28 includes a combination of the primary circuit 30 of the first example with the primary circuit 32 and the secondary circuit 34 of the second example.

FIG. 3 also shows optional optical elements 40*a*, 40*b*, 40*c* and 40*d* of the optical system. This means that in all examples and embodiments in the optical system one or more additional transmissive optical elements (e.g. lenses 40*a*, 40*b* and protective glass 40*c*) and/or reflective optical elements (e.g. a planar deflecting mirror 40*d*) can be provided, for example to deflect the machining laser beam 15. Furthermore, in FIG. 3, the fibre end of a machining laser source 16 is attached to the first interface 14 by way of example. FIG. 3 likewise shows the laser beam guiding device 22 with two actuators 26 by way of example. FIG. 3 also shows that the laser beam guiding device 22 can be connected to a control unit 27 in a wired or wireless data-conducting manner in order to control the actuators 26. For example, 27 Lissajous figures can be stored in a database of the control unit, and the control unit can control the individual actuators accordingly. The aforementioned modifications can also be provided in the machining apparatuses 100 and 200 of FIGS. 1 and 2.

The cooling device 28 of the third example thus consists of the primary circuit 30 of the first example and the primary circuit and the secondary circuit 34 of the second example. The cooling device 28 is thus designed in two stages, wherein the primary circuit 30 forms the first stage and the primary circuit 32 and the secondary circuit 34 forming the second stage. The first and second primary circuits 30 and 32 can be coupled and operated with the same cooling fluid. The elements and functions of the first and second examples are implemented analogously in the third example. Thus, the wall of the cooling device 28, which in the second example forms the housing and partially surrounds the laser beam guiding device 22, is designed as the wall 37 of the cooling housing as in the first example. The cooling housing has inner lines which, together with a cooling fluid supply line and a cooling fluid discharge line, form the first primary circuit 30 of the cooling device 28.

The two-stage cooling device 28 can provide excellent cooling performance during the operation of the machining apparatus 300 and the laser beam guiding device 22. The second cooling fluid, which is introduced into the interior 36 by the secondary circuit 34 and flows around the actuators 26, is namely not only cooled by the primary circuit 32 but also by the primary circuit 30. The actuators 26 are thus cooled particularly effectively and stabilised during operation. In this way, a designed beam parameter product of the machining laser beam 15 and a desired intensity distribution of the laser beam spot on the workpiece can be reliably provided even with high heat exposure/development and in long-term operation. The additional cooling of the second cooling fluid in the interior 36 caused by the primary circuit 30 also facilitates that the cooling fluid is held in the interior 36 and shows only a slight tendency to flow into the optical chamber. In this way, the substantially closed secondary circuit 34 is stabilised. Contamination of the optical chamber by the second cooling fluid is avoided and losses of the second cooling fluid are minimised.

In a modification of the example of FIG. 3, the laser beam guiding device 22 can have a substantially circular segmented mirror with a diameter of approx. 50 mm as a reflective, movable surface 24 with 41 mirror segments separated from one another and arranged next to one another, which form a concentric pattern. Each mirror segment has a gold coating, is reflective for the machining laser beam 15 and can be individually dynamically oriented by means of a piezo actuator 26. In this modification, several piezo actuators 26 are provided, which are arranged according to the pattern of the mirror segments. In the present example, these are piezo actuators based on a modified PZT ceramic with a typical operating voltage of 120 V. The laser beam guiding device 22 thus provides a segmented total surface reflecting the machining laser beam 15, the surface geometry of which, in particular the curvature thereof, can be adjusted in a highly dynamic manner.

The following applications of the above modification of the third example with segmented mirror are possible: The laser beam guiding device 22 can be used as zoom optics, wherein the machining laser beam 15 is deflected by the segmented mirror with the desired selectable beam divergence. The focal length of the optical system can also be modified with the laser beam guiding device 22. The laser beam guiding device 22 can also be used as static beam shaping optics. The surface 24 of the segmented mirror assumes an adequate controllable surface curvature depending on the desired aberration. The more actuators operate the segmented mirror, the more arbitrary the surface may be. Furthermore, the laser beam guiding device 22 can be used for dynamic beam shaping. Thus, the surface 24 of the segmented mirror is changed with a sufficiently high frequency above 10 Hz, in particular above 100 Hz, such that the resulting focus on the workpiece 12 performs the desired movement at least lateral to the laser beam propagation. Such movements can be configured as desired, for example, all possible Lissajous figures can be written on the workpiece, and the beam parameter product of the machining laser beam integrated over time is modified.

In a further modification of the third example, the laser beam guiding device 22 has a deformable mirror (DM, dynamic mirror) in order to provide a movable, reflective, continuous surface 24. The mirror is formed by a membrane made of deformable material, which is dynamically deformable by means of the actuators. In the present example, the membrane is circular with a diameter of approximately 45 mm. On the underside of the membrane, there are individually controllable piezo actuators 26 which are evenly distributed in a circular pattern. This example concerns piezo actuators based on a modified PZT (lead zirconate titanate) ceramic with a typical operating voltage of 120 V. For example, 32 piezo actuators 26 are provided, with which 32 individual flat areas of the membrane can be individually adjusted. The top of the membrane is covered with a highly reflective multi-layer dielectric coating which can contain copper. The deformable, reflective and continuous surface thus provided is suitable for laser beams up to 120 kW at a wavelength of 1060 to 1090 nm. The movable, reflective, continuous surface 24 of the deformable mirror (DM, dynamic mirror) can be operated in the same way as the previously described segmented mirror.

In embodiments of the machining apparatus, the at least one movable surface is adjustable by means of at least one cooled actuator. Furthermore, the at least one movable surface can provide a surface unit of the laser beam guiding device whose surface geometry, in particular its curvature, can be dynamically adjusted. As a result, not only can the machining laser beam be shaped and/or moved at least perpendicular to its direction of propagation, but the divergence of the machining laser beam can also be changed and/or the focus position of the machining laser beam can be shifted parallel to its direction of propagation.

With the laser beam guiding device and the dynamically adjustable movable surface, the embodiments of the machining apparatus enable a modification of the beam parameter product of the machining laser beam. The beam parameter product can be modified with static or dynamic beam shaping of the machining laser beam, as a result of which advantageous intensity distributions and power distributions of its beam spot can be provided.

By cooling the at least one actuator, the aforementioned functions of the laser beam guiding device are stabilised even in the event of high heat exposure/development, in particular in long-term operation in, for example, industrial applications. Thus, the at least one movable surface can be adjusted reliably by the at least one cooled actuator in a desired frequency range and even at high frequencies from several 100 Hz to a few kHz, even with high heat exposure/development and in long-term operation.

The machining apparatus according to embodiments further enables the at least one actuator to be cooled without the first cooling fluid coming into contact with the same. Contamination of the actuator and the optical chamber of the machining apparatus with the first cooling fluid is thus avoided. Further embodiments enable the second cooling fluid, which comes into contact with and cools the actuator, to flow through a substantially closed cooling circuit. In this way, contamination and damage to optical elements in the optical chamber are minimised.

Finally, it should be noted that the description of the invention and the exemplary embodiments are not to be understood as limiting in terms of a particular physical realisation of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining apparatus for laser machining workpieces can be produced so as to be distributed over several physical products.

LIST OF REFERENCE SIGNS

12 Workpiece
13 Machining zone
14 First interface
15 Machining laser beam
16 Machining laser source
17 Second interface 18 Outlet opening
22 Laser beam guiding device
23 Opening
24 Movable surface
26 Actuator
27 Control unit
28 Cooling device
30 Primary circuit
32 Primary circuit
34 Secondary circuit
35 Circulation pump
36 Interior
37 Cooling structure, wall
40a Lens
40b Lens
40d Deflecting mirror
40c Protective glass
100 Machining apparatus
200 Machining apparatus
300 Machining apparatus

The invention claimed is:

1. A machining apparatus for laser machining a workpiece in a machining zone, the machining apparatus comprising:
   a laser machining head, having a first interface for a machining laser source for generating a machining laser beam;
   an outlet opening for the machining laser beam;
   an optical system between the first interface and the outlet opening, which has at least one laser beam guiding device having at least one movable surface and at least one actuator, with which the movable surface is dynamically adjustable; and
   a cooling device for cooling the at least one actuator, wherein the cooling device has at least one primary circuit through which a first cooling fluid can flow without contact with the actuator;
   characterized in that the cooling device has a closed secondary circuit, through which a second cooling fluid can flow in contact with the actuator and which can be cooled by a first of the primary circuits.

2. The machining apparatus according to claim 1,
   wherein the cooling device has at least one element selected from a cooling structure and an interior of the cooling device in which the at least one actuator and/or the laser beam guiding device is at least partially arranged.

3. The machining apparatus according to claim 2,
   wherein the interior is part of the secondary circuit; and/or
   wherein the cooling structure is part of the first or a second of the primary circuits.

4. The machining apparatus according to claim 2,
   wherein the cooling structure has a wall of the cooling device, which wall can be flowed through and at least partially surround the interior of the cooling device and/or the laser beam guiding device; and/or
   wherein the cooling structure has at least one cooling fin, which can be flowed through and is arranged in the interior of the cooling device.

5. The machining apparatus according to claim 1,
   wherein the machining apparatus has a second interface, at which the cooling device and/or the laser beam guiding device are interchangeably provided; and/or
   wherein the first cooling fluid is liquid and/or the second cooling fluid is gaseous; and/or
   wherein the cooling device is provided in a gas-tight manner on the machining apparatus.

6. The machining apparatus according to claim 1,
   wherein the at least one actuator is selected from a piezo actuator, an actuator of a galvanometer scanner, a plurality thereof and a combination thereof; and/or
   wherein the at least one movable surface is at least partially reflective for the machining laser beam, and/or
   wherein the at least one movable surface is dynamically orientable; and/or
   wherein the at least one movable surface is a continuous surface that is dynamically deformable; and/or
   wherein the movable surface is dynamically adjustable such that it modifies the beam parameter product of the temporally integrated machining laser beam; and/or
   wherein the at least one movable surface is adjustable such that it modifies the focal length of the optical system; and/or
   wherein the at least one movable surface is adjustable such that it modifies the axial focus position of the machining laser beam.

7. The machining apparatus according to claim 1,
   wherein the laser beam guiding device has, as the at least one movable surface, at least one segmented mirror with a plurality of mirror segments, each of which are dynamically orientable; and/or
   wherein the laser beam guiding device has, as the at least one movable surface, at least one dynamically deformable mirror.

8. The machining apparatus according to claim 1,
   wherein the at least one movable surface is adjustable such that it dynamically moves the machining laser beam at least perpendicular to the direction of propagation; and/or
   wherein the at least one movable surface is adjustable such that it dynamically moves the machining laser beam and generates at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

9. The machining apparatus according to claim 1,
   wherein the at least one actuator is configured to dynamically adjust the movable surface at a high frequency; and/or
   wherein the at least one movable surface is adjustable with a frequency between 10 Hz and 15 kHz.

10. The machining apparatus according to claim 9,
    wherein the at least one movable surface is adjustable with a frequency between 100 Hz and 10 kHz.

11. The machining apparatus according to claim 9,
    wherein the at least one movable surface is adjustable with a frequency between 400 Hz and 10 kHz.

12. The machining apparatus according to claim 1,
    wherein the at least one movable surface of the laser beam guiding device is arranged and configured such that the machining laser beam is deflected at an angle of less than, equal to, or greater than 90°; and/or
    wherein the first interface is connected or provided with a machining laser source for generating the machining laser beam; and/or
    wherein a control unit for controlling the laser beam guiding device is provided; and/or
    wherein the machining laser source provides a laser power of at least 1 kW.

13. The machining apparatus according to claim 12, wherein the machining laser source provides a laser power of at least 4 kW.

14. The machining apparatus according to claim 12, wherein the machining laser source provides a laser power of between 1 kW to 30 kW.

15. The machining apparatus according to claim 12, wherein the machining laser source provides a laser power of between 1 kW to 25 kW.

16. A method for laser machining a workpiece with a machining apparatus according to claim 1, comprising:
- irradiation of a machining zone of a workpiece with a machining laser beam from a machining laser source, which is provided at the first interface of the machining apparatus, through the outlet opening of the machining apparatus;
- cooling of the at least one actuator of the laser beam guiding device by means of the first cooling fluid flowing through the at least one primary circuit without contact with the actuator; and
- dynamic adjustment of the movable surface with the at least one cooled actuator.

17. The method according to claim 16, wherein cooling the actuator comprises at least one step selected from:
- the second cooling fluid in contact with the actuator flowing through the closed secondary circuit, wherein the closed secondary circuit is cooled by the first cooling fluid flowing through the first of the primary circuits; and
- the first cooling fluid flowing through the first and/or the second of the primary circuits.

18. The method according to claim 16,
wherein the movable surface is dynamically adjusted such that it modifies the beam parameter product of the temporally integrated machining laser beam; and/or
wherein the laser beam guiding device dynamically moves the machining laser beam at least perpendicular to the direction of propagation; and/or
wherein the laser beam guiding device dynamically moves the machining laser beam and generates at least one focal point oscillation with at least one oscillation amplitude and at least one oscillation frequency and with a focal point oscillation path that corresponds to a two- or three-dimensional Lissajous figure or a combination of two- or three-dimensional Lissajous figures.

\* \* \* \* \*